(12) United States Patent
Kwon et al.

(10) Patent No.: US 8,051,567 B2
(45) Date of Patent: Nov. 8, 2011

(54) STEERING WHEEL AND METHOD OF MANUFACTURING THE SAME

(75) Inventors: Young-Hyuck Kwon, Ulsan Metropolitan (KR); Bum-Jae Park, Ulsan Metropolitan (KR); Man-Soo Lee, Ulsan Metropolitan (KR)

(73) Assignee: LG Chem, Ltd., Seoul (KR)

( * ) Notice: Subject to any disclaimer, the term of this patent is extended or adjusted under 35 U.S.C. 154(b) by 1029 days.

(21) Appl. No.: 11/984,101

(22) Filed: Nov. 13, 2007

(65) Prior Publication Data
US 2008/0250643 A1    Oct. 16, 2008

(30) Foreign Application Priority Data

Apr. 10, 2007 (KR) .................. 10-2007-0034891
Jul. 23, 2007 (KR) .................. 10-2007-0073267

(51) Int. Cl.
*B21D 39/03* (2006.01)
*B21D 53/26* (2006.01)
*B23P 11/02* (2006.01)
*B62D 1/04* (2006.01)

(52) U.S. Cl. .............. 29/894.1; 29/428; 74/552; 74/558
(58) Field of Classification Search ................ 29/894.1, 29/428, 450; 74/552, 558
See application file for complete search history.

(56) References Cited

U.S. PATENT DOCUMENTS

| 6,365,875 B1 * | 4/2002 | Kreuzer et al. ............... 219/204 |
| 6,564,674 B2 * | 5/2003 | Ishii et al. ........................ 74/552 |
| 6,651,526 B1 * | 11/2003 | Imaizumi et al. ............... 74/552 |
| 6,668,682 B1 | 12/2003 | Emeneth et al. |
| 6,695,942 B2 * | 2/2004 | Testa ............................. 156/222 |
| 6,736,026 B2 * | 5/2004 | Lorenz ........................... 74/552 |
| 6,797,087 B2 * | 9/2004 | Hosokawa et al. .......... 156/73.1 |

(Continued)

FOREIGN PATENT DOCUMENTS

| DE | 200 06 621 | 8/2000 |
| DE | 20 2004 012304 | 12/2004 |
| EP | 0 849 112 | 6/1998 |

(Continued)

*Primary Examiner* — David Bryant
*Assistant Examiner* — Alexander P Taousakis
(74) *Attorney, Agent, or Firm* — McKenna Long & Aldridge LLP (57) ABSTRACT

The present invention provides a steering wheel and a method of manufacturing the wheel that includes: providing parts including a frame 112 that is composed of a rim 112a and spokes 112b, an upper foam member 114 that is fitted on the upper portion of the frame, a lower foam member 116 that is fitted on the lower portion of the frame and contacts upper foam member 114, and a leather cover 118 that covers upper foam member 114 and lower foam member 116; assembling the foam members by fitting upper foam member 114 and lower foam member 116 onto the upper portion and the lower portion of frame 112; and attaching leather cover 118 by covering the outsides of upper foam member 114 and lower foam member 116 with the leather cover. According to the steering wheel, first circular grooves G11 where at least one of upper foam member 114 and lower foam member 116 is fitted are formed along the circumference of rim 112a of frame 112 to prevent rotation of the foam members and reduce the weight of the frame. Further, first circular protrusions P11 where first circular grooves G11 are fitted are formed on the upper and lower foam members. Therefore, it is possible to achieve a light-weight steering wheel by reducing the weight of the foam member and to simply manufacture the steering wheel by modifying the manufacturing processes. Therefore, it is possible to improve productivity with the reduced manufacturing cost, and the natural frequency with high recyclability.

12 Claims, 12 Drawing Sheets

U.S. PATENT DOCUMENTS

| | | | |
|---|---|---|---|
| 6,817,100 B2 * | 11/2004 | Mori et al. | 29/894.1 |
| 6,928,898 B2 | 8/2005 | Albayrak et al. | |
| 7,143,663 B2 * | 12/2006 | Menaldo et al. | 74/552 |
| 2001/0027698 A1 | 10/2001 | Fleckenstein | |
| 2004/0050204 A1 | 3/2004 | Albayrak et al. | |
| 2004/0154428 A1 * | 8/2004 | Albayrak et al. | 74/552 |
| 2006/0053956 A1 | 3/2006 | Kreuzer | |
| 2010/0251849 A1 * | 10/2010 | Kurata et al. | 74/552 |

FOREIGN PATENT DOCUMENTS

| | | |
|---|---|---|
| EP | 0 849 127 | 6/1998 |
| GB | 2 058 694 | 4/1981 |
| GB | 2 339 008 | 1/2000 |
| JP | 2000-085586 | 3/2000 |
| JP | 2005-271880 | 10/2005 |
| KR | 2001-0031760 | 4/2001 |
| WO | WO 99/22923 | 5/1999 |

* cited by examiner

STEERING WHEEL AND METHOD OF MANUFACTURING THE SAME

CROSS-REFERENCE TO RELATED APPLICATIONS

The present application is based on, and claims priority from, Korean Application Serial Numbers 10-2007-0034891 and 10-2007-0073267, filed on Apr. 10 and Jul. 23, 2007, the disclosures of which are hereby incorporated by reference herein in its entirety.

FIELD OF THE INVENTION

The present invention relates to a steering wheel and a method of manufacturing the same. The present invention relates to a steering wheel that can be simply manufactured with a low manufacturing cost and high recyclability, and a method of manufacturing the same, by omitting a foaming process, with the frame of the steering wheel in a mold.

BACKGROUND OF THE INVENTION

In general, mounted at one end of the steering shaft connected to the steering gear, a steering wheel of a vehicle allows the wheels to turn by transmitting the amount of its turning to the steering gear through the steering shaft and is made of a light-weight material, such as PVC or urethane, to improve steering performance of a driver.

Figure 1:
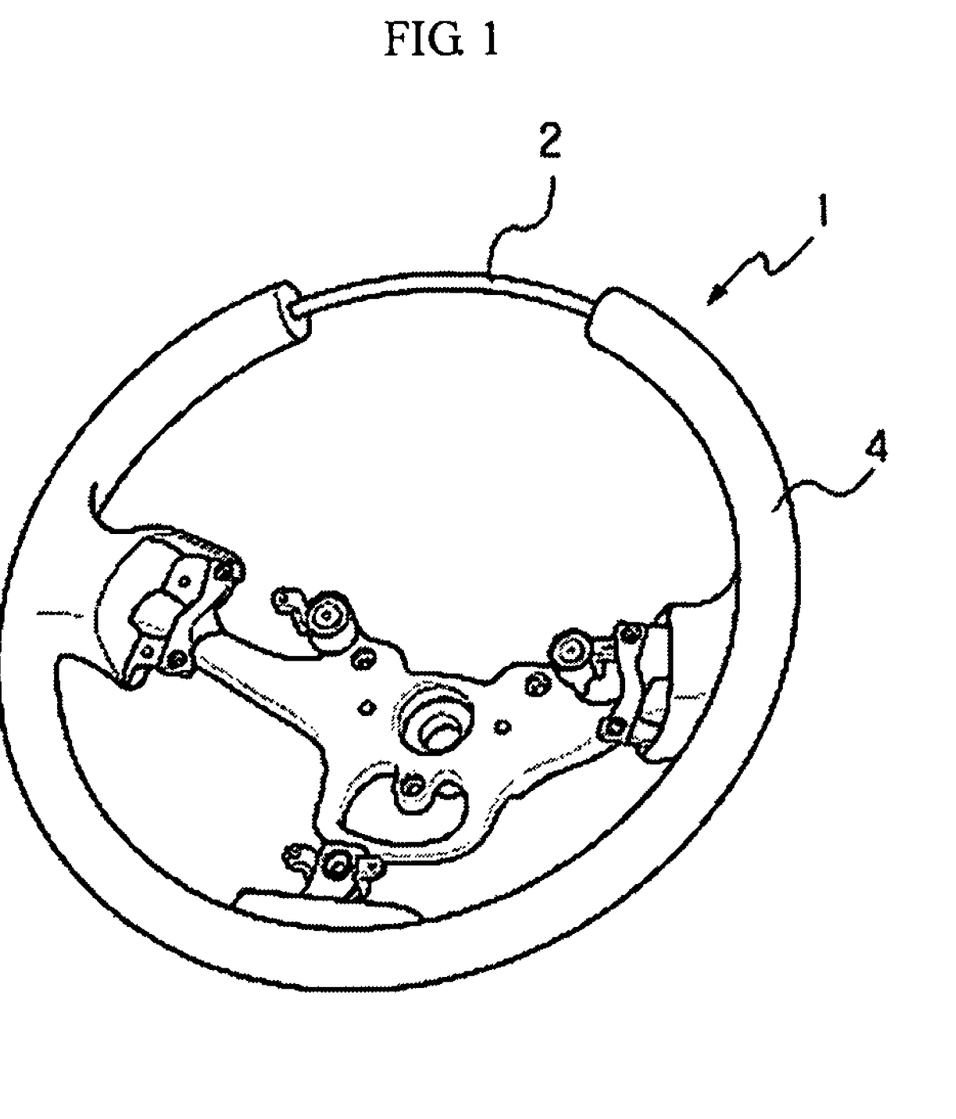
FIG. 1 is a perspective view of a general steering wheel with a part cut.

A common steering wheel 1, as shown in FIG. 1, is completed as a product by forming a synthetic resin part 4 around a frame 2 of steel or light alloy by foaming of a synthetic resin (polyurethane). The surface of the steering wheel coated with synthetic resin part 4 is hard and slippery, such that the driver may easily feel tired in steering, which may occur an accident may. Therefore, in order to overcome the problems, a product with a leather cover sewn or bonded around the outside of synthetic resin part 4 has been manufactured.

Figure 2:
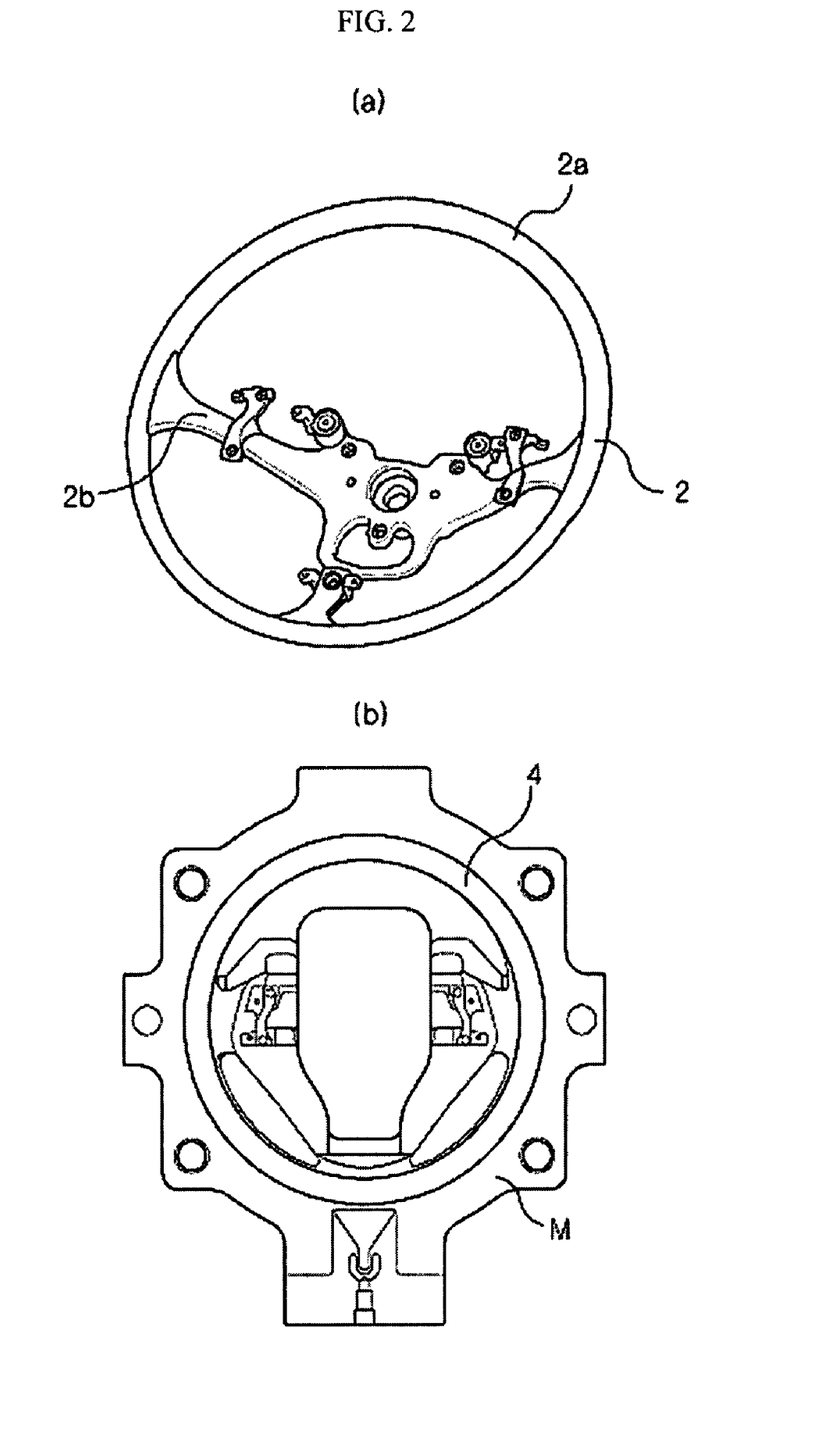
FIGS. 2A and 2B are views illustrating the process of forming the steering wheel of FIG. 1.

In detail, as shown in FIG. 2A, a steering wheel is completed as the following processes: first, inserting a frame 2 composed of a rim 2a and spokes 2b into a foaming mold M as shown in FIG. 2B; forming synthetic resin part 4 of a polyurethane foaming body by foaming polyurethane (polyol, isocyanate hardener, and catalyst), and then sewing or bonding a leather cover around the outside of synthetic resin part 4.

However, the steering wheel and a method of manufacturing the steering wheel as described above had problems that since polyurethane is foamed with frame 2 inserted in foaming mold M to form a synthetic resin part of a foamed body, the manufacturing cost for the product increases because excessive amounts of polyurethane and manufacturing processes, and since the foamed body is formed with the frame, it is difficult to recycle the parts separated.

SUMMARY OF THE INVENTION

It is an object of the invention to provide a steering wheel that can be easily manufactured at a low manufacturing cost by reducing the manufacturing processes and obtain improved recyclability from the parts of the steering wheel that are separated, by separately manufacturing the parts and then simply assembling them, and a method of manufacturing the same.

Embodiments of the present invention provide a steering wheel and a method of manufacturing the steering wheel. The method of manufacturing a steering wheel includes: providing parts including a frame, an upper foam member, a lower foam member, and a leather cover; assembling the foam members; and attaching the leather cover. In the providing of parts, the frame is composed of a rim and spokes, the upper foam member is fitted on the upper portion of the frame, the lower foam member is fitted on the lower portion of the frame and contacts the upper foam member, and the leather cover covers the upper foam member and the lower foam member. In the assembling of the foam members, the upper foam member and the lower foam member are fitted onto the upper portion and the lower portion of the frame. In the attaching of the leather cover, the outsides of the upper foam member and the lower foam member are covered with the leather cover. Further, first circular grooves G11, G11' where at least one of the upper foam member and the lower foam member is fitted are formed along the circumference of the rim of the frame to prevent rotation of the foam members and reduce the weight of the frame. Furthermore, first circular protrusions P11, P11' where the first circular grooves G11, G11' are fitted are formed on the upper or lower foam member.

A second circular protrusion P22 that is fitted into the foam member without first circular protrusion P11 to prevent rotation of the foam member is formed along the circumference on the side (outside) opposite to the side with the first circular groove G11 in the rim. A second circular groove G22 where second circular protrusion P22 is fitted is formed in the foam member without first circular protrusion P11.

A second circular groove G32 that is fitted into the foam member without first circular protrusion P11 to prevent rotation of the foam member may be formed along the circumference on the side (outside) opposite to the side with first circular groove G11 in the rim. Further, a second circular protrusion P32 that is fitted into second circular groove G32 may be formed on the foam member without first circular protrusion P11.

Circular grooves G11', G22', G32' are separated at predetermined distances and separate circular protrusions P11', P22', P32' that are fitted into the circular grooves are formed along the circumferences of the rim and the foam members to prevent the foam members from circumferentially rotating in the assembling of the rim and foam members and ensure a tolerance for expansion due to foaming in manufacturing the foam members.

First circular groove G11 and first circular protrusion P11 that is fitted into the first circular groove may be formed in a plurality of lines to prevent movement of the foam members by increasing a frictional force.

The foam members are separated into a plurality of parts in the circumferential direction of the rim. Protrusions SP are formed at the foam member that is fitted where the spokes are formed to cover portions of the spokes. A plurality of protrusions P53, P53' with a head are formed on the contact surfaces of the protrusions with the spokes. A plurality of locking grooves G53, G53' where the protrusions are fitted and locked are formed in the spokes.

The head of the protrusion is formed in a spherical shape or a conical shape with the top cut.

Protrusions P64, P74 and grooves G64, G74 facing each other are formed on the contact surfaces of the upper foam member and the lower foam members to increase the locking force.

Small protrusions P85 that are melt by surface friction generated by supersonic wave vibration to increase the combining force may be formed on the contact surfaces of one of the upper foam member and the lower foam member.

Further, an adhesive may be provide on the contact surface of the upper foam member and the lower foam member to increase the as combining force.

According to a steering wheel and a method of manufacturing the steering wheel of the invention, since the steering wheel is manufactured by simply assembling parts that are separated manufactured, it is possible to achieve a lightweight steering wheel by reducing the weight of the foam member and to simply manufacture the steering wheel by modifying the manufacturing processes. Further, it is possible to improve productivity with the reduced manufacturing cost, and the natural frequency with high recyclability.

BRIEF DESCRIPTION OF THE DRAWINGS

For better understanding of the nature and objects of the present invention, reference should be made to the following detailed description with the accompanying drawings, in which:

FIGS. 5A to 5F are view illustrating a method of manufacturing of a steering wheel according to a first embodiment of the invention;

DETAILED DESCRIPTION OF THE PREFERRED EMBODIMENTS

Figure 3:
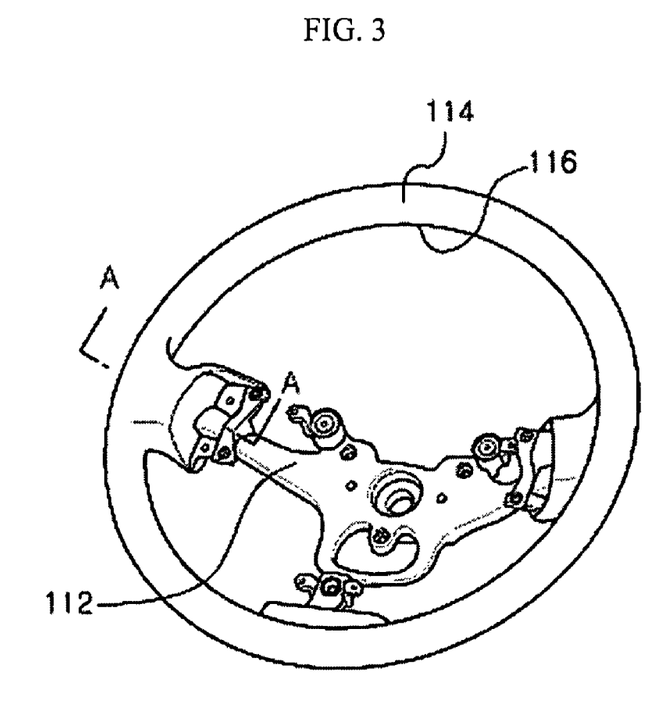
FIG. 3 is a perspective view of a steering wheel to which the invention is applied (with a leather cover and an assembling portion at the center removed)
Figure 4:
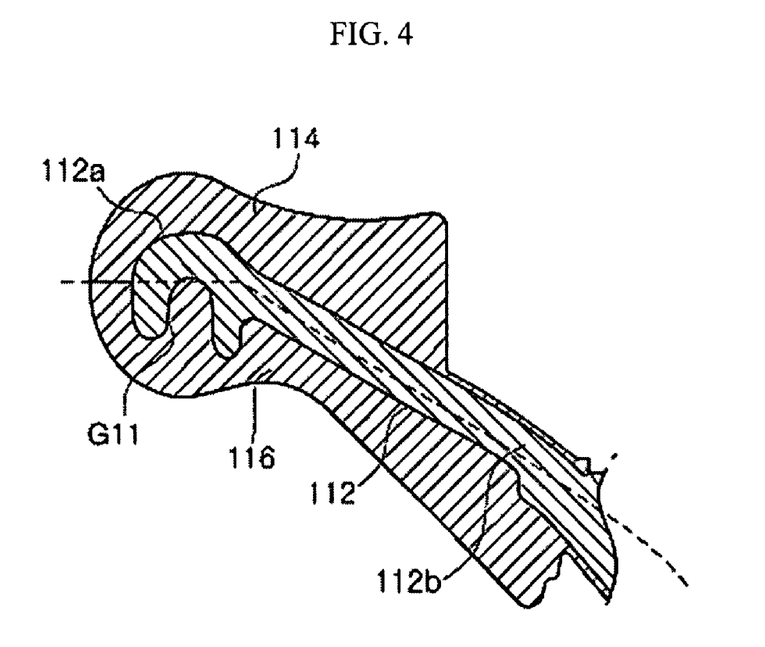
FIG. 4 is a cross-sectional view taken along the line A-A of FIG. 3.

Referring to FIGS. 3 and 4, a steering wheel is manufactured by covering a frame 112 composed of a rim 112a and spokes 112b with an upper foam member 114 and a lower foam member 116 and then sewing or bonding a leather cover (118 in FIG. 5) around the outside of upper and lower foam members 114, 116.

Frame 112 is made of steel or light alloy, manufactured by die casting, or composed of rim 112a and spokes 112b that are separately formed and integrated by welding.

A first circular hole G11 is formed along the circumference of rim 112a of frame 112 to reduce the weight of the frame and fit a first circular protrusion of lower foam member 116 (described below) so that the foam member cannot rotate.

Upper foam member 114 and lower foam member 116 are formed by foaming EPS (Expendable Polystyrene) or EPP (Expendable Polypropylene) and the method is disclosed in Korean Patent Publication No. 2001-0031760. Upper and lower foam members 114, 116 are formed in a circular shape along rim 112a of frame 112 and each include a portion that protrude inside the circular shape and cover a portion of spoke 112b. The first circular protrusion P11 that is fitted in first circular groove G11 of the rim is formed on lower foam member 116. It is impossible to recycle the steering wheel made of polyurethane in the related art, but EPP used in the invention is non-crosslinked foam polypropylene, such that the raw material is easy to dispose, such as recycling or reutilizing after pulverizing.

The leather cover 118 is natural leather or synthetic leather, and as leather covers known in the art, attached to the foam members by sewing through sewing holes at the ends in the width direction or by an adhesive (including a double-sided adhesive).

Figure 5:
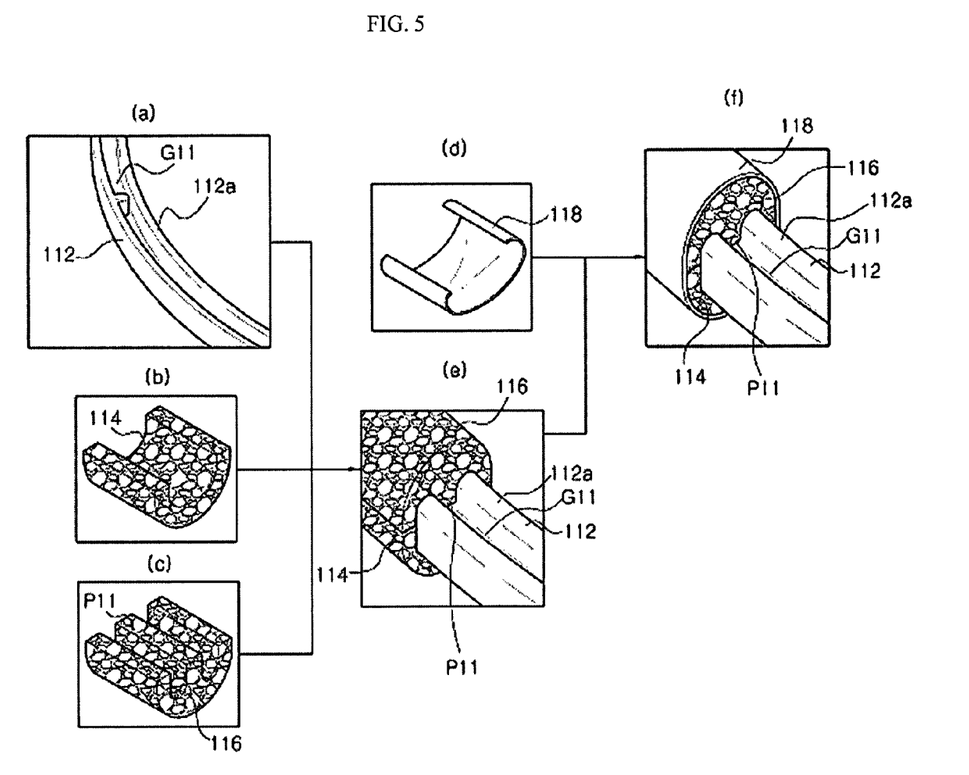

The steering wheel having the above configuration is assembled in the order shown in FIG. 5 (upside down to show the first circular hole and the first circular protrusion).

First, frame (112 in FIG. 5A) composed of rim 112a and spokes 112b, upper foam member (114 in FIG. 5B) that is disposed at the upper portion of frame 112, lower foam member (116 in FIG. 5C) that is disposed at the lower portion of frame 112 and contacts upper foam member 114, and leather cover (118 in FIG. 5D) that covers upper foam member 114 and lower foam member 116 are provided (providing parts).

Next, upper foam member 114 and lower foam member 116 are fitted onto the upper and lower portion of frame 112 to adhere thereto (FIG. 5E: fitting the foam members).

Subsequently, upper foam member 114 and lower foam member 116 are covered by a leather cover (118 in FIG. 5D) and the leather cover is sewed by a sewing method known in the art or bonded by an adhesive (FIG. 5F: fixing a cover); as a result, the steering wheel is simply assembled.

According to the first embodiment of the invention, first circular groove G11 is formed along the circumference of the rim and first circular protrusion P11 that is fitted into first circular groove G11 is formed in lower foam member 116 to prevent rotation of lower foam member 116 and reduce the weight of the frame. However, first circular protrusion P11 may be formed in upper foam member 114.

Figure 6:
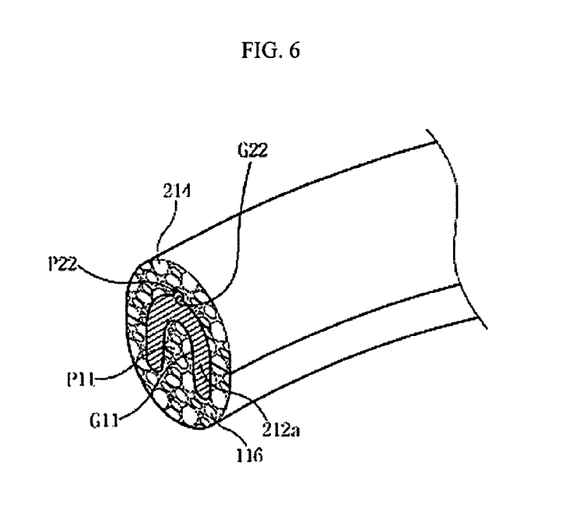
FIG. 6 is a perspective view showing the cross-section of a steering wheel that is in the manufacturing process to illustrate a second embodiment of the invention.

Referring to FIG. 6, a perspective view showing the cross-section of a steering wheel that is in the manufacturing process to illustrate a second embodiment, in a steering wheel according to the second embodiment, a second circular protrusion P22 that is fitted into an upper foam member 214 to prevent rotation of the foam member is formed along the circumference on the side (outside) opposite to the side with first circular groove G11 in a rim 212a, and a second circular groove G22 where second circular protrusion P22 is fitted is formed on the inside of upper foam member 214. The configuration and a method of manufacturing lower foam member 116, first circular protrusion P11, and first circular groove G11 are the same in the first embodiment.

Figure 7:
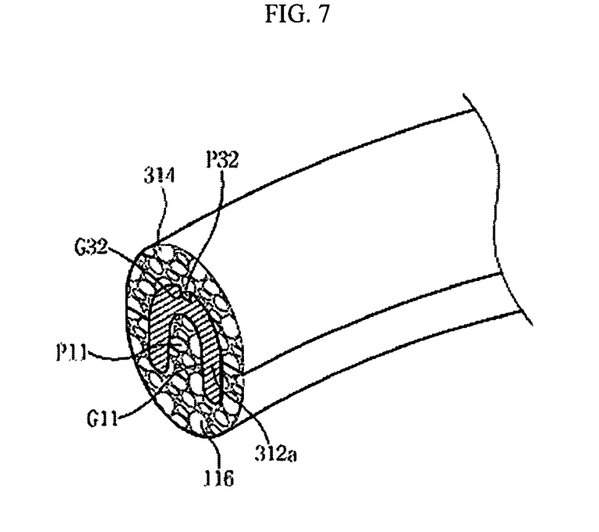
FIG. 7 is a perspective view showing the cross-section of a steering wheel that is in the manufacturing process to illustrate a third embodiment of the invention.

Referring to FIG. 7, a perspective view showing the cross-section of a steering wheel that is in the manufacturing process to illustrate a third embodiment, in a steering wheel according to the third embodiment of the invention, a second circular groove G32 where an upper foam member 314 is fitted to prevent rotation of the foam member is formed along the circumference on the side (outside) opposite to the side with first circular groove G11 in a rim 312a, and a second circular protrusion P32 that is fitted into second circular groove G32 is formed on the inside of upper foam member 314. The configuration and a method of manufacturing lower foam member 116, first circular protrusion P11, and first circular groove G11 are the same in the first embodiment.

Figure 8:
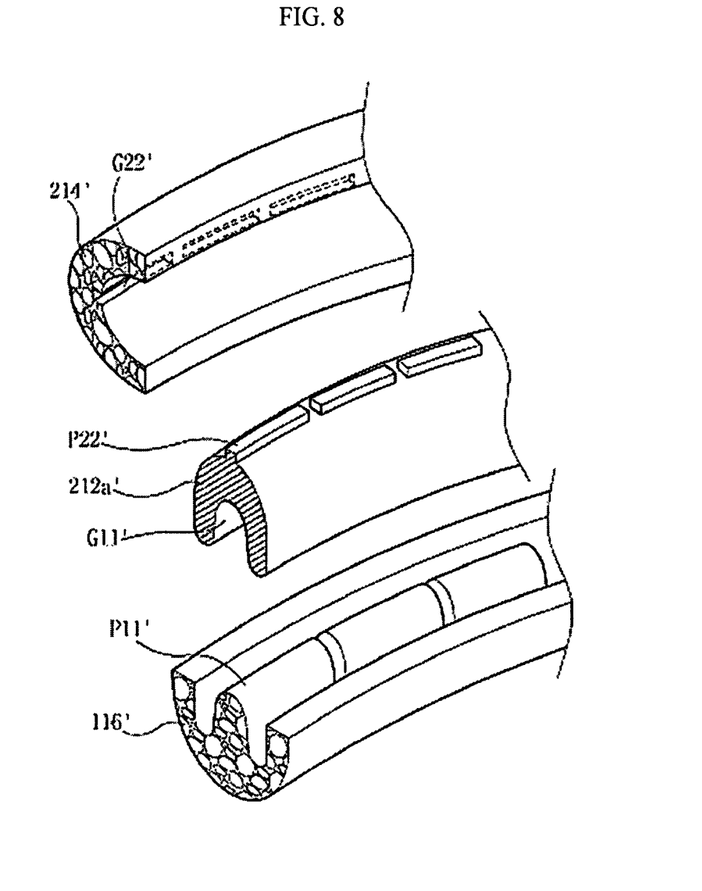
FIG. 8 is a view showing a modification from the second embodiment (FIG. 6) of the invention.
Figure 9:
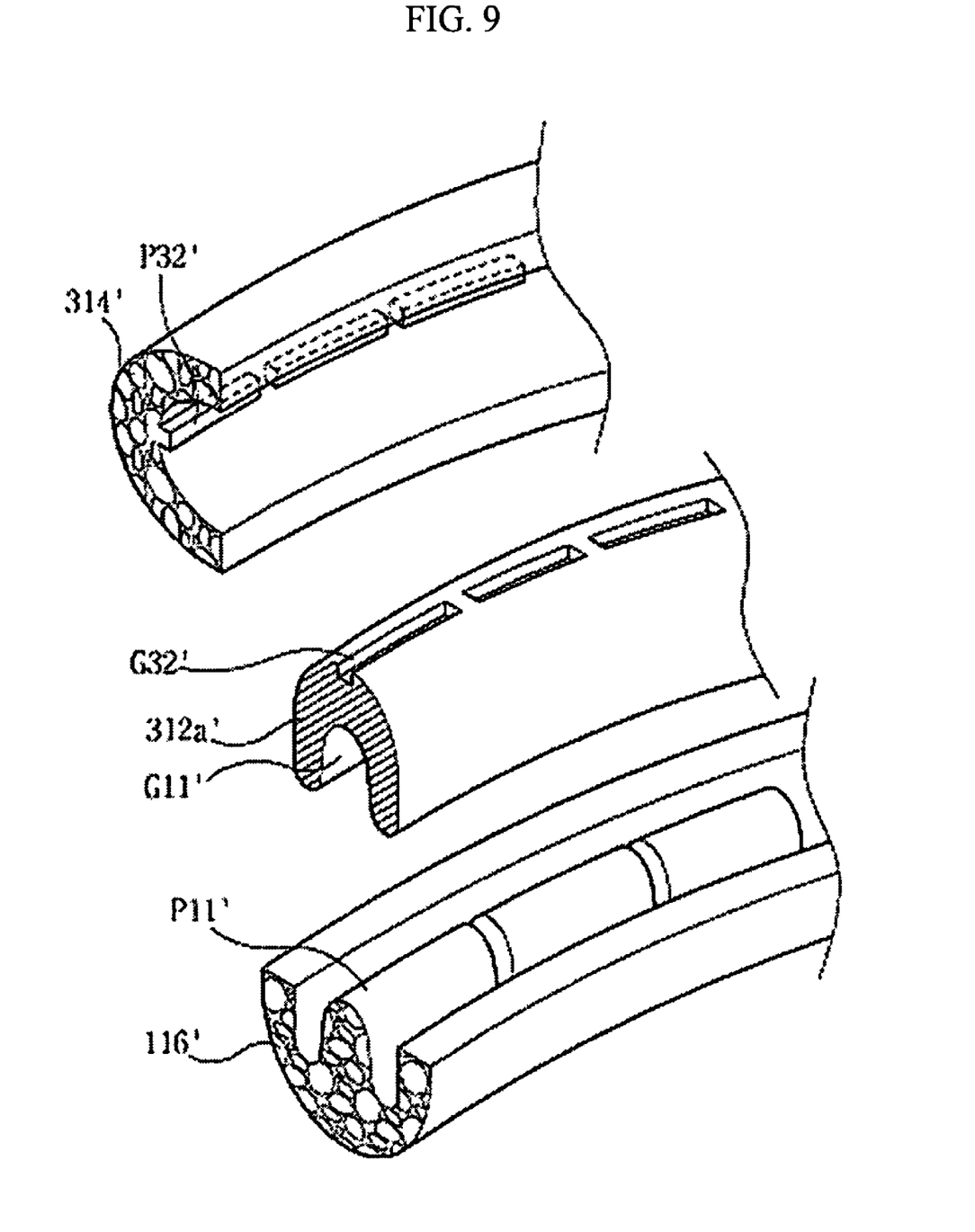
FIG. 9 is a view showing a modification from the third embodiment (FIG. 7) of the invention.

FIG. 8 shows a modification for manufacturing a steering wheel with a plurality of first and second circular grooves G11', G22' and first and second circular protrusions P11', P22' that are separated along the circumferences, replacing the first and second circular grooves and the first and second circular protrusions in the second embodiment (shown in FIG. 6). FIG. 9 shows a modification for manufacturing a steering wheel with a plurality of first and second circular grooves G11', G32' and first and second circular protrusions P11', P32' that are separated along the circumferences, replacing the first and second circular grooves and the first and second circular protrusions in the third embodiment (shown in FIG. 7). According to the modifications of a steering wheel with the first and second circular grooves and the first and second circular protrusions that are formed separately, while the foam members is prevented from rotating in assembling the rim and foam members, a tolerance for expansion due to foaming in manufacturing the foam members is ensured.

Figure 10:
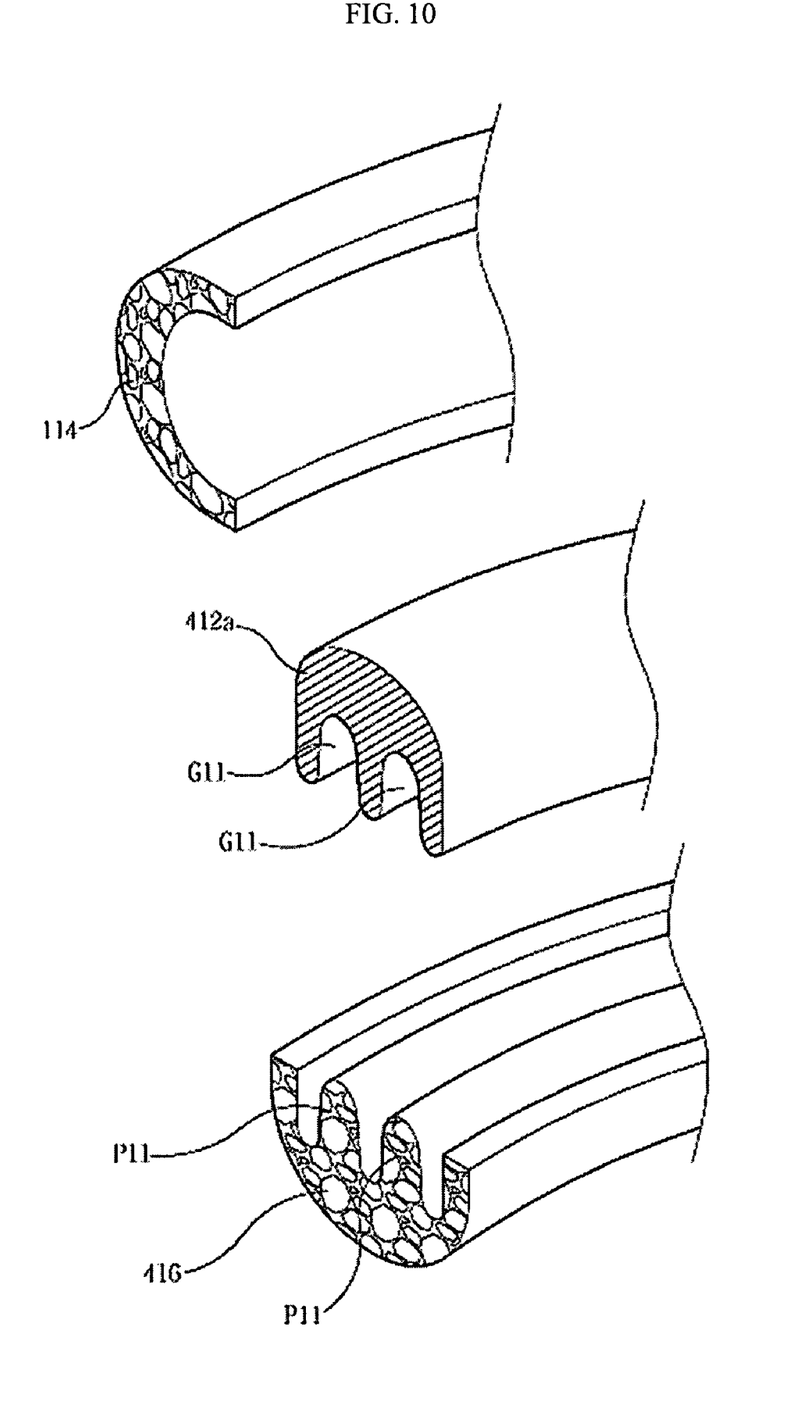
FIG. 10 is a perspective view showing the cross-sections of separate parts of a steering wheel that is in the manufacturing process to illustrate a fourth embodiment of the invention.

Referring to FIG. 10, a perspective view showing the cross-sections of the separate parts of a steering wheel that is in the manufacturing process to illustrate a fourth embodiment, in a steering wheel according to the fourth embodiment, first circular grooves G11 and first circular protrusions P11 that are formed on a lower foam member 416 to fit into corresponding first circular grooves G11 are formed in a plurality of lines (two lines) in a rim 412a, respectively, in order to fix the foam members by increasing the frictional force. The configuration of upper foam member 114 and the method of manufacturing the steering wheel are the same as in the first embodiment.

Figure 11:
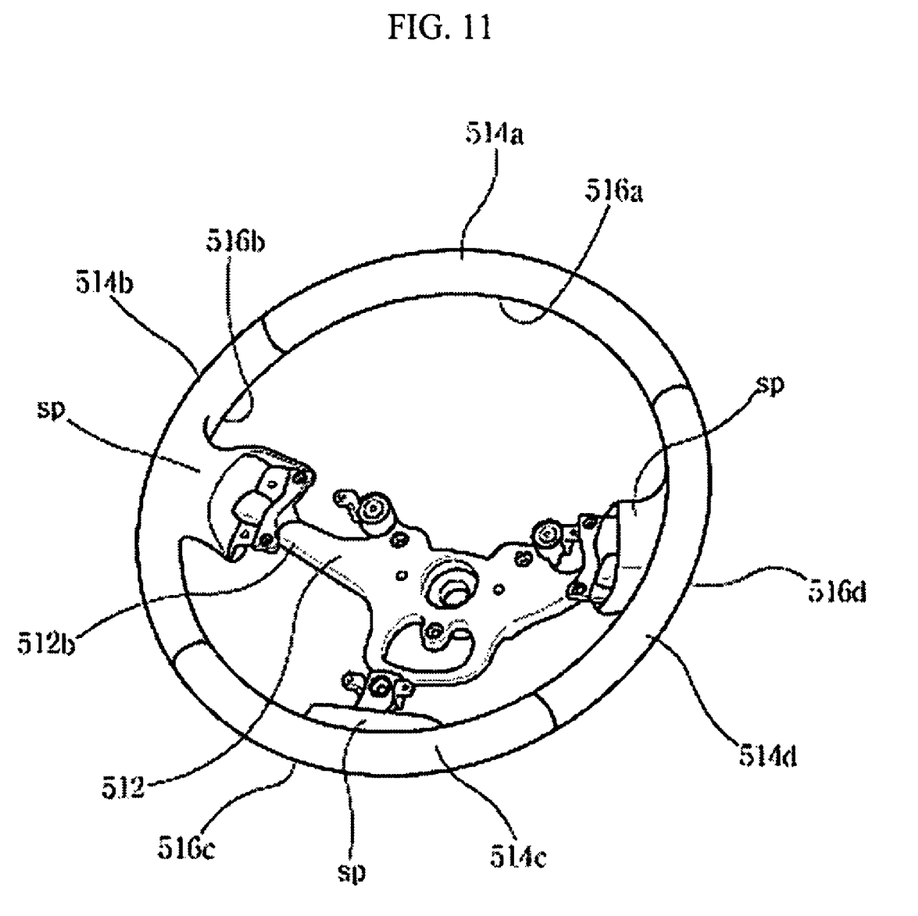
FIG. 11 is a perspective view of a steering wheel to which a fifth embodiment of the invention is applied (with a leather cover and an assembling portion at the center removed)
Figure 12:
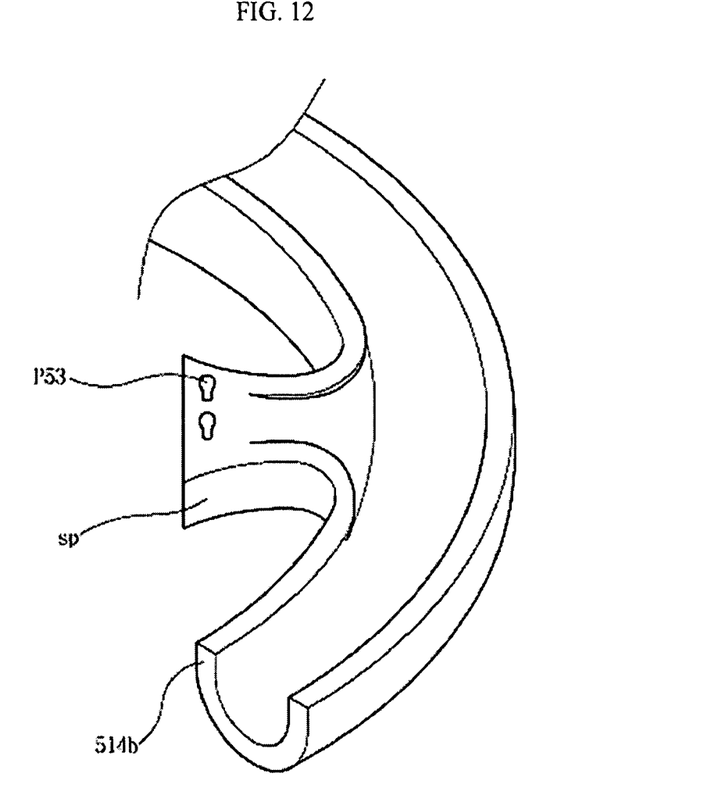
FIG. 12 is a perspective view of an upper foam member that is disposed where a the spoke is formed in FIG. 11, seen from under side.
Figure 13:
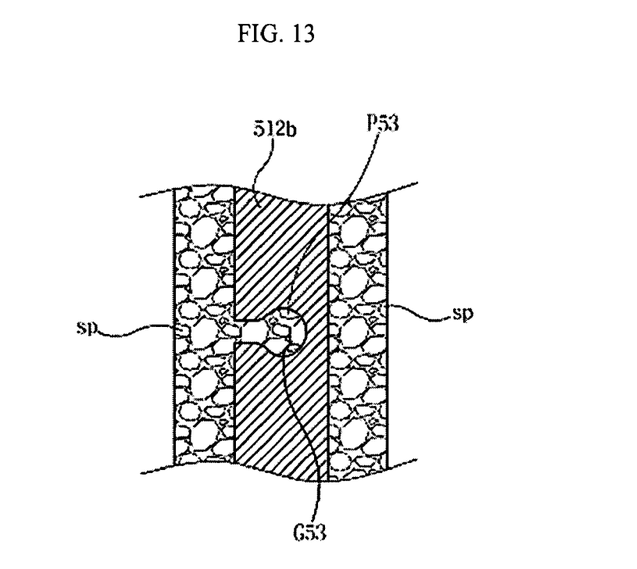
FIG. 13 is a view illustrating a protrusion fitted in a locking groove of FIG. 12.
Figure 14:
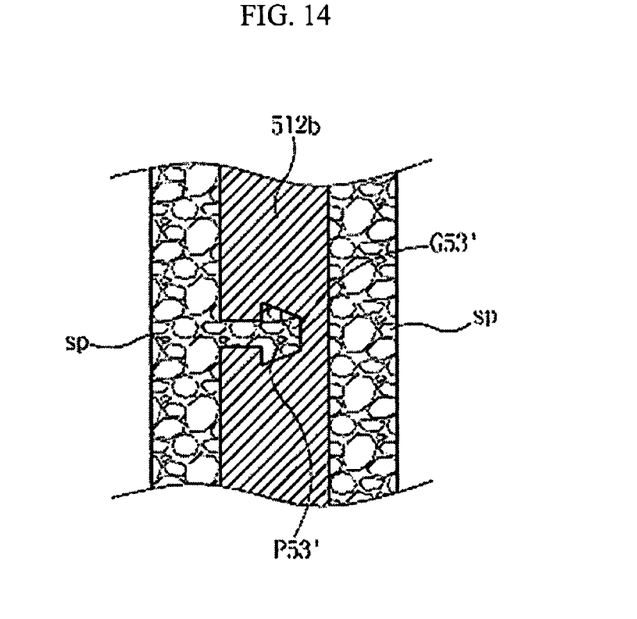
FIG. 14 is a view illustrating a protrusion fitted in a locking groove according to another exemplary from FIG. 13.

FIGS. 11 to 14 are views illustrating a steering wheel and a method of manufacturing the steering wheel according to a fifth embodiment. As shown in FIG. 11, upper foam members 514a, 514b, 514c, 514d and lower foam members 516a, 516b, 516c, 516d are separated along the circumference of the rim (not shown) of a frame 512. Protrusions SP are formed at upper foams 514b, 514c, 514d and lower foams 516b, 516c, 516d that are positioned where spokes 512b are formed to cover portions of spokes 512b in the frame 512. A plurality of (two) protrusions (P53 in FIG. 12) with a head on the surface contacting spoke 512b are formed in each of protrusions SP. Further, as shown in FIGS. 13 and 14, a plurality of locking grooves G53, G53' where protrusions P53, P53' are fitted and locked are formed in spoke 512b. The head of protrusions P53, P53', as shown in FIG. 13, is formed in a spherical shape for easy locking/unlocking, or as shown in FIG. 14, in a conical shape with the top cut to obtain a strong locking force.

Figure 15:
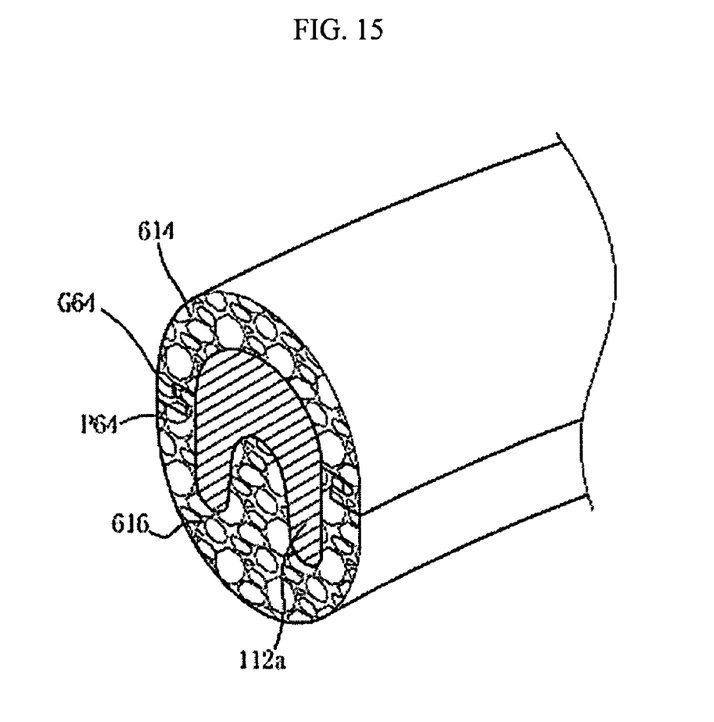
FIG. 15 is a perspective view showing the cross-section of a steering wheel that is in the manufacturing process to illustrate a sixth embodiment of the invention.

Referring to FIG. 15, a perspective view showing the cross-section of a steering wheel that is in the manufacturing process to illustrate a sixth embodiment of the invention, in a steering wheel according to the sixth embodiment, protrusions P64 and grooves G64 that are locked are formed to face each other at the contact surfaces of an upper foam member 614 and a lower foam member 616 that cover a rim 112a in order to increase the locking force. Protrusion P64 and groove G64 each have a locking step and are formed continuously or separately along the circumferences of upper and lower foam members 614, 616.

Figure 16:
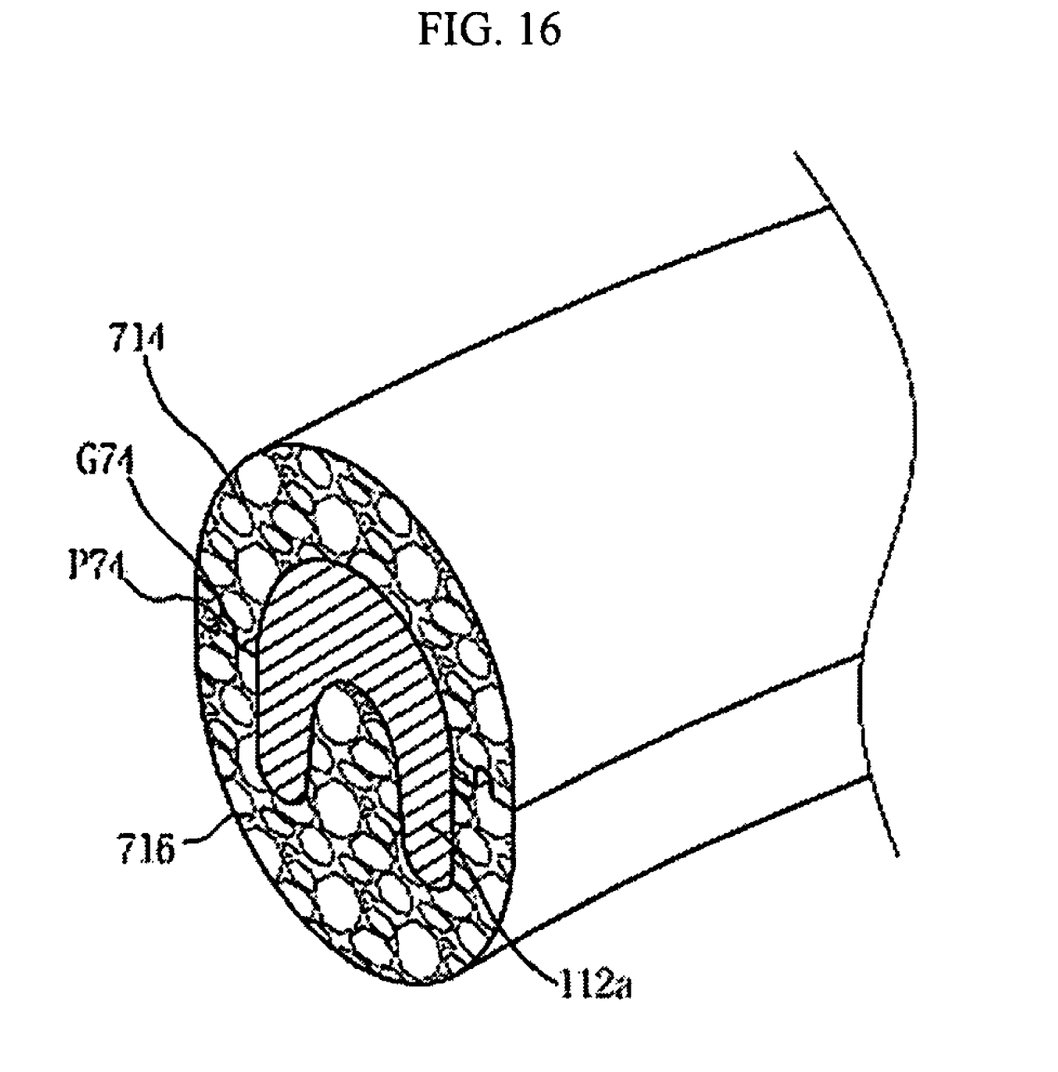
FIG. 16 is a perspective view showing the cross-section of a steering wheel that is in the manufacturing process to illustrate a seventh embodiment of the invention.

Referring to FIG. 16, a perspective view showing the cross-section of a steering wheel that is in the manufacturing process to illustrate a seventh embodiment, in a steering wheel according to the seventh embodiment, protrusions P74 and grooves G74 that are locked are formed to face each other at the contact surfaces of an upper foam member 714 and a lower foam member 716 that cover a rim 112a in order to increase the locking force, but a locking step is not formed at protrusions P74 and grooves G74 for easy assembly. Protrusions P74 and grooves G74 are formed continuously or separately along the circumference of upper and lower foam members 714, 716.

Figure 17:
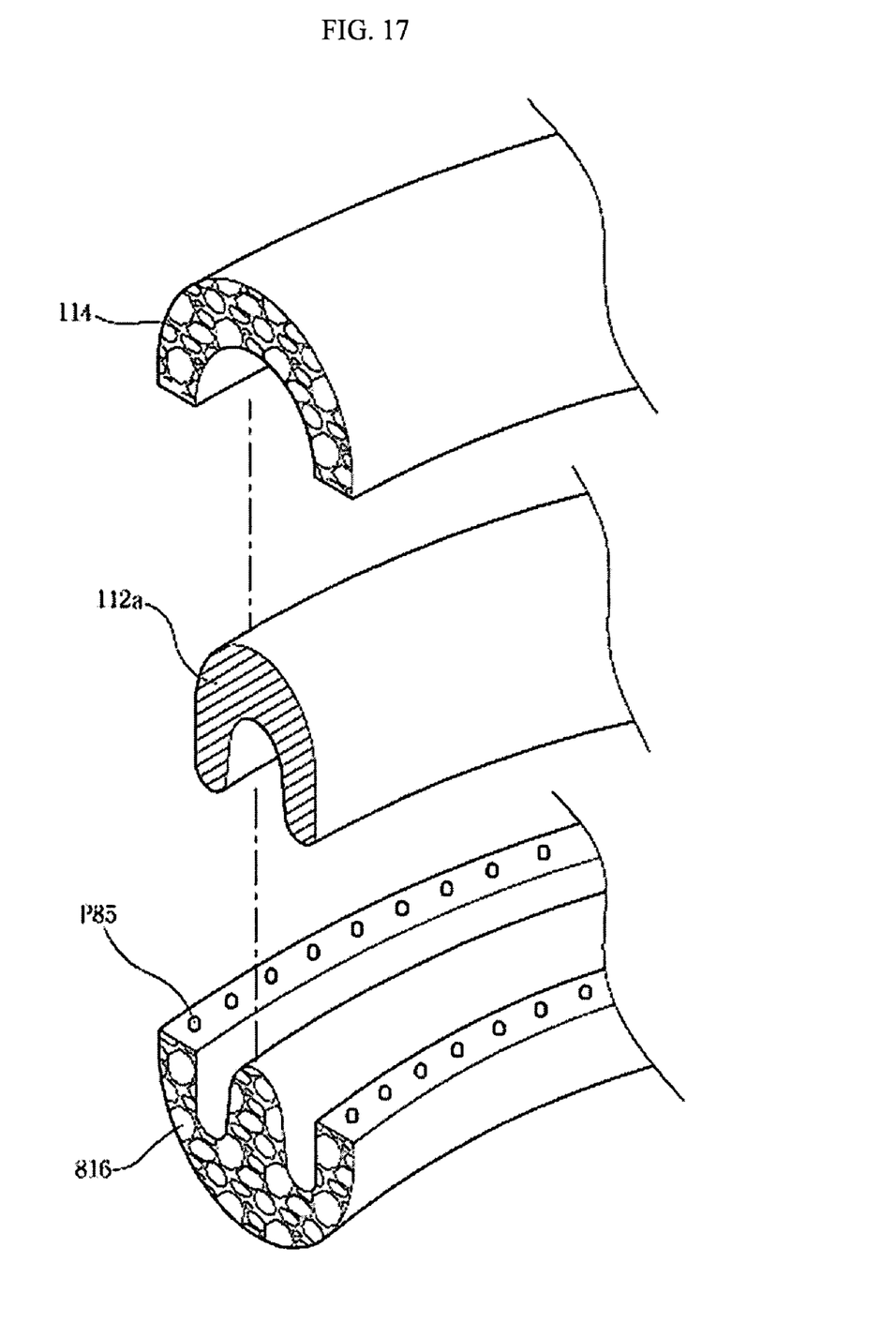
FIG. 17 is a perspective view showing the cross-sections of the parts of a steering wheel that are separated to illustrate an eighth embodiment of the invention.

Referring to FIG. 17, a perspective view showing the cross-sections of the parts of a steering wheel that are separated to illustrate an eighth embodiment, small protrusions P85 that are melt by surface friction generated by supersonic wave vibration to increase the combining force are formed on the contact surfaces of one of upper foam member 114 and a lower foam member 816 that cover rim 112a of a steering wheel according to the eighth embodiment. Small protrusions P85 are formed on the contact surfaces of lower foam member 816 in this embodiment. Small protrusions P85 closely contact lower foam member 816 to upper foam member 114 by melting as an adhesive when supersonic wave vibration is applied.

On the other hand, in the first to fifth embodiments, an adhesive known in the art may be provided on the contact surfaces of the upper foam member and lower foam member to increase the combining force, and in all of the embodiments of the invention (first to eighth embodiments), an adhesive known in the art may be applied on the contact surfaces of the upper and lower foam members to increase the combining force.

Since a steering wheel according to an embodiment of the invention is manufactured by simply assembling parts that are separately manufactured, it is easy to manufacture the steering wheel with reduced manufacturing processes and cost. Further, steering wheels made of polyurethane in the related art are difficult to recycle, but EPP (Expendable Polypropylene) that is used in the invention is non-crosslinked polypropylene; therefore, the raw material is easy to dispose, such as recycling or reutilizing after pulverizing. Further, since the foam members are fitted on the rim, it is possible to obtain high recyclability from the parts separated.

Further, although a steering wheel is a part that requires emotional quality for direct contact of a driver, vibration caused by the engine is transmitted to the steering wheel, such that it is required to control the natural frequency over a predetermined value to improve ride quality by preventing resonance of the steering wheel due to the vibration of the engine. Accordingly, a steering wheel where the invention is applied is light and improves the natural frequency, such that it is possible to improve ride quality.

According to an aspect of the invention, it is possible to achieve a light-weight steering wheel by reducing the weight of the foam member and to simply manufacture the steering wheel by modifying the manufacturing processes. Therefore, it is possible to improve productivity with the reduced manufacturing cost, and the natural frequency with high recyclability.

What is claimed is:

1. A method of manufacturing a steering wheel, the method comprising:
providing parts including a frame that is composed of a rim and spokes, an upper foam member that is fitted on the upper portion of the frame, a lower foam member that is fitted on the lower portion of the frame and contacts the upper foam member, and a leather cover that covers the upper foam member and the lower foam member;
assembling the foam members by fitting the upper foam member and the lower foam member onto the upper portion and the lower portion of the frame; and
attaching the leather cover by covering the outsides of the upper foam member and the lower foam member with the leather cover,
wherein first circular grooves where at least one of the upper foam member and the lower foam member is fitted are formed along the circumference of the rim of the frame to prevent rotation of the foam members and reduce the weight of the frame,
first circular protrusions where the first circular grooves are fitted are formed on the upper or lower foam member,
protrusions are formed at the foam member that is fitted where the spokes are formed to cover portions of the spokes,
a plurality of protrusions with a head are formed on the contact surfaces of the protrusions with the spokes, and
a plurality of locking grooves where the protrusions are fitted and locked are formed in the spokes.

2. The method as defined in claim 1, wherein a second circular protrusion that is fitted into the foam member without the first circular protrusion to prevent rotation of the foam member is formed along the circumference on the side (outside) opposite to the side with the first circular groove in the rim, and
a second circular groove where the second circular protrusion is fitted is formed in the foam member without the first circular protrusion.

3. The method as defined in claim 1, wherein a second circular groove that is fitted into the foam member without the first circular protrusion to prevent rotation of the foam member is formed along the circumference on the side (outside) opposite to the side with the first circular groove in the rim, and
a second circular protrusion that is fitted into the second circular groove is formed on the foam member without the first circular protrusion.

4. The method as defined in claim 1, further comprising:
providing a plurality of circular grooves along the circumference of the rim,
wherein the circular grooves are separated at predetermined distances and providing a plurality of circular protrusions along the circumference of one of the foam members,
wherein the providing prevents circumferential rotation of the foam members relative to the rim; and fitting said circular protrusions into said circular grooves.

5. The method as defined in claim 1, wherein the first circular groove and the first circular protrusion that is fitted into the first circular groove are formed in a plurality of lines to prevent movement of the foam members by increasing a frictional force.

6. The method as defined in claim 1, wherein the foam members are separated into a plurality of parts in the circumferential direction of the rim.

7. The method as defined in claim 6, wherein the head of the protrusion is spherical.

8. The method as defined in claim 6, wherein the head of the protrusion is a cone with the top cut.

9. The method as defined in claim 1, wherein protrusions and grooves facing each other are formed on the contact surfaces of the upper foam member and the lower foam members to increase the locking force.

10. The method as defined in claim 1, further comprising
providing small protrusions on the contract surfaces of one of the upper foam member and the lower foam member; and
melting said protrusions by surface friction generated by supersonic wave vibration to increase the combining force.

11. The method as defined in any one of claims 1 to 6 and 7 to 10, wherein the upper foam member and the lower foam member are made of EPS (Expandable Polystyrene) or EPP (Expandable Polypropylene).

12. A steering wheel that is manufactured according to the method of any one of claims 1 to 6 and 7 to 10.

* * * * *